United States Patent
Waldenstrom

[11] 3,744,284
[45] July 10, 1973

[54] TAMPER-PROOF SECURITY DEVICE

[76] Inventor: Carl G. Waldenstrom, 1015 W. Medinah, Bensenville, Ill. 60106

[22] Filed: Feb. 22, 1972

[21] Appl. No.: 228,106

[52] U.S. Cl. .............................................. 70/232
[51] Int. Cl. .......................................... F16b 41/00
[58] Field of Search...................... 70/14, 229, 230, 70/231, 232, 258, 238; 280/438, 507; 287/130, 118; 24/211 M, 249, 299 LL, 249 PP

[56] References Cited
UNITED STATES PATENTS

| | | | |
|---|---|---|---|
| 2,641,124 | 6/1953 | Gallagher et al. | 70/232 |
| 2,554,306 | 5/1951 | Mack | 70/232 X |

*Primary Examiner*—Marvin A. Champion
*Assistant Examiner*—Richard P. Tremblay
*Attorney*—Roy E. Petherbridge

[57] ABSTRACT

A tamper-proof vehicle security device for lockable attachment to the coupling means of a trailer to prevent unauthorized securement of a driving vehicle to the trailer. The securing device includes a housing which surrounds the coupling means, and chain elements are moveable within the housing to lock the housing to the coupling means or permit removal of the securing device. The chain elements are operatively connected to a lock mechanism to effect a desired locking operation. The housing is provided with an exteriorly positioned handle to facilitate mounting and removal of the security device from the trailer.

9 Claims, 5 Drawing Figures

PATENTED JUL 10 1973
3,744,284
SHEET 1 OF 2
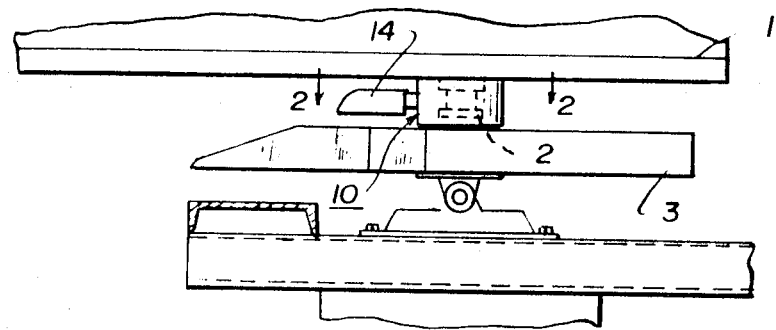
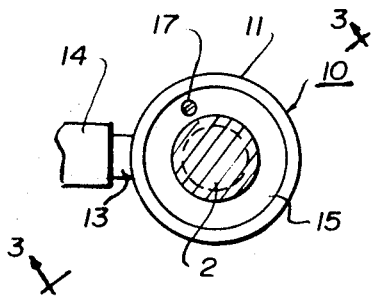
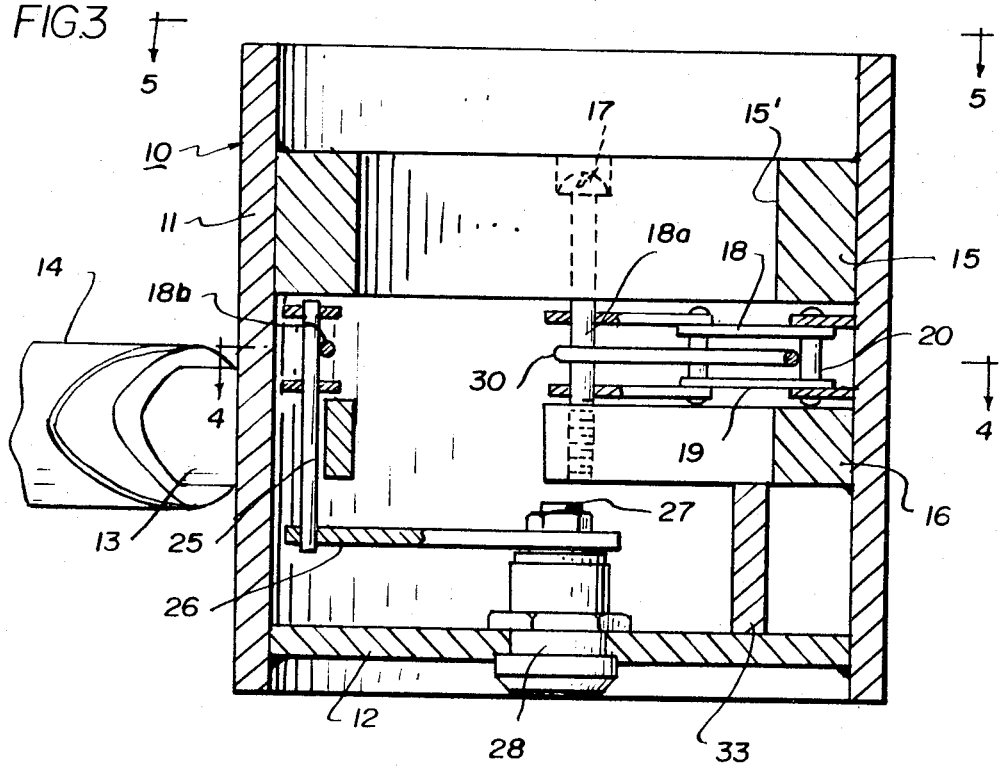

PATENTED JUL 10 1973 3,744,284

TAMPER-PROOF SECURITY DEVICE

BACKGROUND OF THE INVENTION

This invention relates in general to a security device and in particular to a lockable device for preventing unauthorized coupling of a trailer and the like to a motorized vehicle.

More specifically, the invention relates to a tamper-proof vehicle security device for preventing unauthorized coupling of a trailer and the like to a motorized vehicle wherein the device includes a housing for lockable attachment to the coupling means provided on a trailer or other similar vehicle. The housing is provided with a chain means which substantially surrounds the coupling means of the trailer and is moveable from a locked position securing the housing thereto to a unlocked position which allows the housing to be removed for authorized connection of the trailer to a motorized vehicle. The novel design of the device of the invention provides an essentially tamper-proof structure which makes unauthorized removal of the housing from the coupling means of the trailer extremely difficult.

Conventionally, a trailer includes on its forward bottom underside a coupling means referred to as a king pin to which the fifth wheel of a motorized vehicle such as a tractor is connected during operation of the tractor and trailer. A significant problem encountered in the trucking industry is the unauthorized coupling of a tractor to a detached trailer which results in considerable loss of equipment and cargo yearly. Numerous attempts have been made in the prior art to provide means to prevent the unauthorized coupling of a motorized vehicle to a parked trailer. Many of these devices are designed to be attached in a locked relationship on the king pin in such a manner that the existence of the device thereon will prevent normal coupling between the shaft and the fifth wheel of a van.

The prior art technique of locking a housing and the like to a king pin has been deficient in several aspects wherein an important one of these disadvantages is the fact that the prior art device has not been adequately tamper-proof to prevent unauthorized removal. Such a deficiency in the devices is present because of a lack of a sufficient locking contact between the king pin and the theft prevention means. It is often possible to dislodge such prior art theft preventers by striking the exterior of the housing of the security or by ramming the device with a motorized vehicle. In addition to these defects in relation to providing a tamper-proof mechanism, the prior art means for locking trailers are also inefficient under certain environmental conditions such as in very cold weather where the lock mechanisms are difficult to operate. Therefore, it is desirable to provide a king pin locking device which is relatively tamper-proof and which is both efficient to use and inexpensive to manufacture.

SUMMARY OF THE INVENTION

It is therefore an object of this invention to prevent the coupling of a non-motorized trailer and the like to a motorized vehicle.

Another object of this invention is to improve the apparatus for locking the king pin of a trailer.

A further object of this invention is to increase the locking contact between a coupling means of a vehicle and a security device secured thereto.

Still another object of this invention is to attach a security device to the king pin or other shaft by the use of a plurality of linked elements.

These and other objects are attained in accordance with the present invention wherein there is provided a security device to prevent unauthorized coupling or hitching of a motorized vehicle to a trailer and the like. The device of the invention includes a housing which is adapted to be locked on the king pin of the trailer in a manner that coupling between a motorized vehicle and a trailer is impossible while the security device is in position. The housing of the device includes an interiorly mounted lock mechanism having a plurality of linked elements which substantially surround the peripheral surface of the king pin to improve significantly the locking efficiency therebetween. The novel construction of the security device herein disclosed improves the prior art technique of preventing unauthorized removal of the housing from the king pin and is essentially tamper-proof. Moreover, the security device of the invention is readily manipulated into operative position or removed therefrom and can be operated under severe weather conditions.

DESCRIPTION OF THE DRAWINGS

Further objects of the invention, together with additional features contributing thereto and advantages accruing therefrom will be apparent from the following description of an embodiment of the invention when read in conjunction with the accompanying drawings wherein:

FIG. 1 is a side schematic illustration of the security device of the invention in operative position on the king pin of a trailer and adjacent the fifth wheel of a motorized vehicle;

FIG. 2 is a top schematic illustration of the security device of the invention in an unlocked position;

FIG. 3 is a side sectional illustration taken along line 3—3 of FIG. 2;

DESCRIPTION OF THE PREFERRED EMBODIMENT

Figure 4:
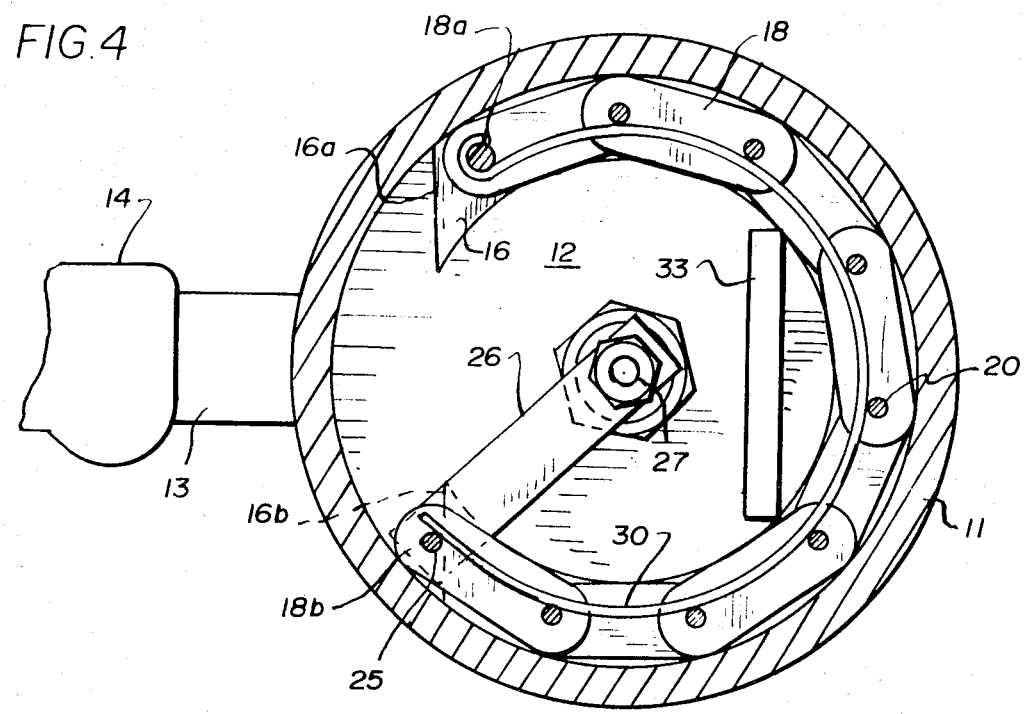
FIG. 4 is a top schematic sectional illustration taken along line 4—4 of FIG. 3.
Figure 5:
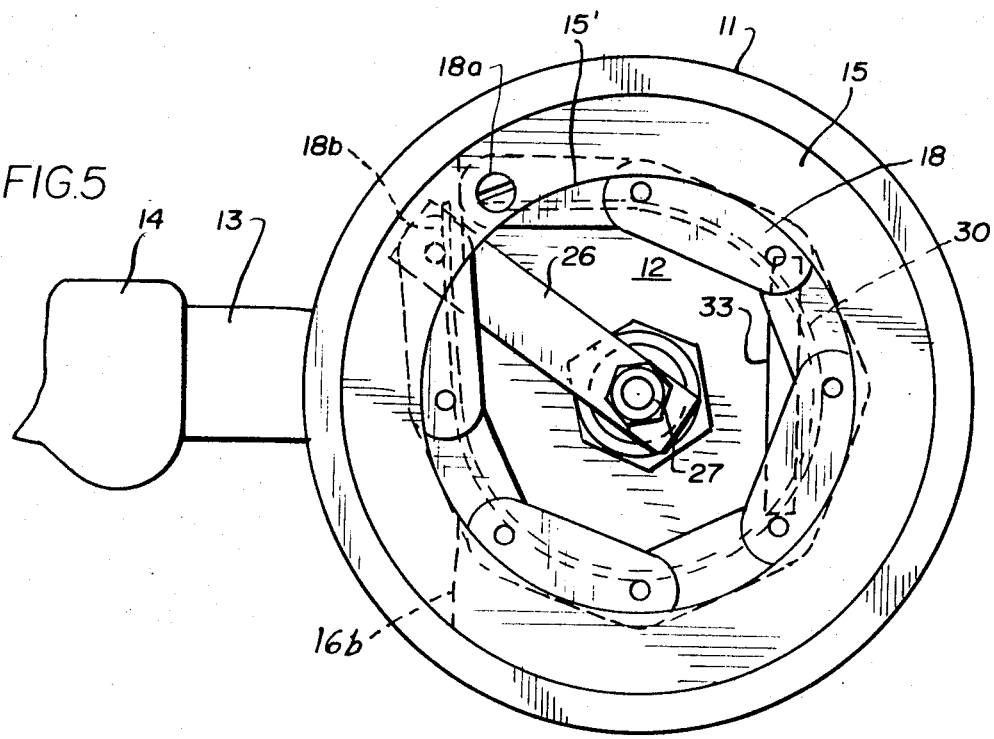
FIG. 5 is a top schematic illustration of the security device of the invention in a locked position.

Referring now to FIG. 1 there is illustrated an embodiment of the security device of the invention in operative position to prevent the unauthorized coupling of a motorized vehicle or van to a trailer and the like. The conventional trailer 1 having a king pin 2 to which the fifth wheel or coupler 3 of a motorized van (not shown) interconnects during operation. Generally, the coupler 3 includes a slot (not shown) in which the king pin interengages into locked operative position during normal operation of a van and trailer. For convenience of illustration, the fifth wheel or coupler 3 is shown in FIG. 1 positioned beneath the king pin but it should be apparent that during normal interconnection of the van and trailer, the king pin and coupler lie on the same horizontal plane for coupling. The presence of the security device of the invention on king pin 2 and will not permit the slot of coupler 3 to interengage with the pin since the housing of the security device is significantly larger than the slot of the coupler. Thus, when the security device of the invention is in position, it is not possible to achieve conventional coupling of a van to the trailer through interconnection of the king pin and coupler.

Referring now to FIGS. 2 through 5 there is illustrated an embodiment of the security device 10 of the invention. The security device 10 includes a hollow cylindrical housing 11 constructed of a suitably strong material such as steel, aluminum and the like to which an interiorly positioned bottom plate 12 is welded or otherwise secured as best shown in FIG. 3. A handle 13 having a grip portion 14 is attached to the exterior of the housing to facilitate manipulation of the security device into position or removal from a king pin. Near the top of the interior of housing 11, a ring 15 is welded or otherwise secured to the interior wall of the housing in manner to reinforce the housing against any blows applied exterior thereof. In addition, the inner edge 15' of ring 15 possesses an inner diameter corresponding substantially to the large outer diameter of a conventional king pin so that the security device may be positioned thereon.

A second semi-circular ring 16 is secured to the inner periphery of housing 11 beneath upper ring 15 in a manner also to increase the strength of the housing against exterior blows and to aid in the support of the locking mechanism of the security device to be described in detail later. The semi-circular ring 16 extends for more than 180° around the interior periphery of the housing and includes angular spaced ends 16a and 16b. Semi-circular ring 16 includes a hole adjacent end 16a which receives a chain supporting bolt 17 wherein the threaded end of the bolt 17 is received in the lower ring. The upper end of the bolt 17 passes through upper ring 15 and it should be apparent that upon security device 10 being locked into position on the king pin, access to screw 17 is not possible. The portion of bolt 17 intermediate rings 15 and 16 provides a retention post to which a chain 18 is suitably attached at end 18a. Chain 18 includes a plurality of pairs of elements 19 interconnected at a plurality of pivots 20 in a manner conventional in the art. The pairs of elements 19 are advantageously spaced as illustrated in FIG. 3 to permit movement of lubricants during adversely cold weather conditions. However, it is within the scope of the invention to utilize other conventional chain elements in the invention if desired.

The other end 18b of chain 18 which is an unlocked position extends adjacent the interior wall of housing 11 for a length approximately equal to the circumferential length of ring 16. A portion of chain 18 adjacent end 18b projects beyond an end of semi-circular ring 16 and interconnects with an upright post member 25 which extends downward into the housing past the bottom of lower semi-circular ring 16. Post member 25 interconnects with a shaft 26 which is coupled to a coupling portion of a lock mechanism extending through the bottom wall 12 of the security device. The lock mechanism may be of any suitable design and operable by a key in a manner to move the coupling means 27 through a desired arc. By moving coupler 27 through the use of the key, shaft 26 and post 25 in turn swing to move end 18b of chain 18. In an open position chain 18 assumes a position directly beneath upper ring 15 to allow the housing to be attached or removed from a king pin. Upon the housing being mounted on a king pin, the key is moved to cause the aforementioned movement of shaft 26 through an arc corresponding substantially to the distance between the ends 16a and 16b of semi-circular ring 16.

Referring now to FIG. 4, movement of the end 18b of chain 18 causes the inner edges of the chain length to move inwardly toward the king pin exterior in a manner to embrace the conventional narrow portion or groove of a king pin and lock the housing thereto. A portion of the chain remains in contact with ring 15 to achieve the desired locking between the king pin and the housing. It can be appreciated in FIG. 5 that end 18a of chain 18 in a locked position is closely adjacent to end 18b resulting in the interior edges of the chain to substantially surround the exterior of the king pin. This increased surrounding contact between the chian and the king pin greatly increases the locking ability of the security device. Moreover, the presence of a plurality of pivots 20 of chain 18 prevents a tampteer from concentrating on one or two pivot points in order to break the securement of the security device to the king pin.

To provide smoother and more positive action of the chain during its locking and unlocking movement, a resilient spring 30 in the form of a wire, attached at one end to chain end 18a, extends radially inward of pivots 20 between links 19 of the chain in a manner to prevent backlashing thereof during operation. In addition, a rectangular upright bar 33 is attached to the upper surface of the bottom plate 12 of the housing and acts an an obstruction when the housing is being mounted to prevent the king pin from striking the lock mechanism and causing damage thereto.

While the invention has been described with reference to a preferred embodiment, it will be understood by these skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A security device for surrounding lockable attachment to the kingpin of a trailer to prevent unauthorized coupling to a mororized vehicle comprising
    a hollow housing having an opening for receiving a kingpin of a trailer in surrounding relationship thereto,
    lock means mounted within the housing for lockable attachment of the housing to the kingpin,
    said lock means including chain means movable from an unlocked position out of contact with the kingpin on which the housing is mounted to a locked position in contact with the kingpin to secure the housing thereto, and
    said chain means when in a locked position surrounding a substantial portion of the periphery of the kingpin.

2. The security device of claim 1 wherein the chain means includes a plurality of pairs of parallel link elements interconnected by a plurality of pivot posts.

3. The security device of claim 1 wherein the hollow housing possesses a cylindrical configuration having a closed end.

4. The security device of claim 1 wherein one end of the chain means is immovably attached to the housing and the other end is adapted to be movable relative thereto.

5. The security device of claim 4 wherein said lock means includes a linkage means for moving the other end of the chain means.

6. The security device of claim 5 wherein the other end of the chain means is movable from a position spaced from said one end of the chain means in the locked position to a position adjacent said one end in an unlocked position.

7. The security device of claim 5 wherein the linkage means is operatively connected to an exteriorly accessible lock mechanism.

8. The security device of claim 1 further comprising abutment means mounted in the housing for contacting an end of the kingpin and limit the depth of penetration thereof in the housing.

9. The security device of claim 1 further comprising handle means attached to the exterior of the housing to facilitate manipulation thereof.

* * * * *

UNITED STATES PATENT OFFICE
CERTIFICATE OF CORRECTION

Patent No. 3,744,284      Dated July 10, 1973

Inventor(s) CARL G. WALDENSTROM

It is certified that error appears in the above-identified patent and that said Letters Patent are hereby corrected as shown below:

Column 4, line 51, "mororized" should read -- motorized -- .

Signed and sealed this 25th day of December 1973.

(SEAL)
Attest:

EDWARD M. FLETCHER, JR.
Attesting Officer

RENE D. TEGTMEYER
Acting Commissioner of Patents